No. 712,052. Patented Oct. 28, 1902.
H. F. T. ERBEN & A. F. KNIGHT.
SYSTEM OF ELECTRICAL DISTRIBUTION.
(Application filed Apr. 8, 1901.)
(No Model.)
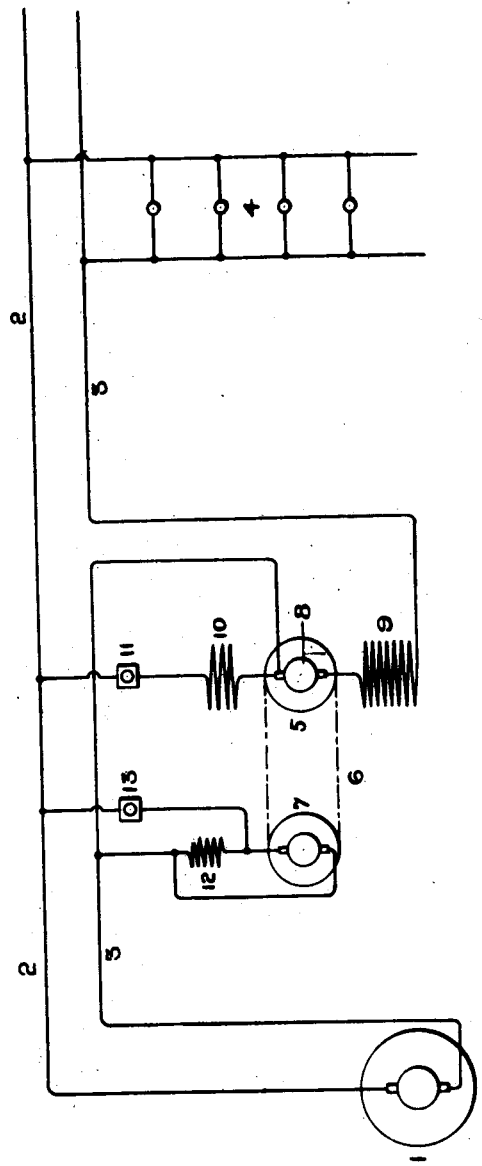
Witnesses:
Inventors.
Hermann F.T.Erben,
Arthur F.Knight.
by Albert G. Davis
Att'y.

UNITED STATES PATENT OFFICE.

HERMANN F. T. ERBEN AND ARTHUR F. KNIGHT, OF SCHENECTADY, NEW YORK, ASSIGNORS TO GENERAL ELECTRIC COMPANY, A CORPORATION OF NEW YORK.

SYSTEM OF ELECTRICAL DISTRIBUTION.

SPECIFICATION forming part of Letters Patent No. 712,052, dated October 28, 1902.

Application filed April 8, 1901. Serial No. 54,847. (No model.)

*To all whom it may concern:*

Be it known that we, HERMANN F. T. ERBEN and ARTHUR F. KNIGHT, citizens of the United States, residing at Schenectady, county of Schenectady, State of New York, have invented certain new and useful Improvements in Systems of Electrical Distribution, (Case No. 2,086,) of which the following is a specification.

In the practical operation of boosters for electric circuits it is in many cases exceedingly desirable that the boosting effect should vary as nearly as possible in proportion to the variation of current in the booster-circuit. This result, however, is difficult of attainment, due first to the residual magnetism of the magnetic circuit of the booster and also to the droop of the saturation-curve of the magnetic circuit as the load on the booster changes from no load toward full load. The residual magnetism causes the boosting effect to be greater in proportion toward no load than toward full load and even to have a considerable value on open circuit. Due to the causes mentioned the external characteristic of the booster represents a more or less considerable boosting effect on open circuit, which boosting effect, however, rises at first in nearly a straight line as the load comes on and then commences to droop more or less, depending upon the design of the particular machine under consideration. In boosters having a characteristic curve of the nature described it will therefore be seen that if the boosting effect is adjusted so as to be correct at full load it will have an unduly high value at half load and lower loads. We have discovered that this objection may be obviated by placing upon the field of the booster a small constantly-excited differential field of a value approximately sufficient to eliminate the residual magnetism of the booster at no load. With the addition of this winding the characteristic curve of the booster will rise from a point near the origin, thereby causing a reduction of the boosting effect in the neighborhood of half load, but not interfering appreciably with the boosting effect at full load, since owing to the deviation in the saturation-curve from a straight line a small magnetomotive force at or near full load has comparatively small effect in changing the voltage of the booster.

Our invention will be better understood by reference to the following description, taken in connection with the accompanying drawing, which represents in diagram one embodiment of our invention, while its scope will be more particularly pointed out in the appended claims.

At 1 is indicated any suitable source of current from which extend distributing-conductors 2 3, feeding translating devices of any desired character, (indicated conventionally at 4.) We in connection with these conductors I have represented a boosting device operating in accordance with our invention, this device consisting in the present instance of a compound-wound booster 5, mechanically driven by a belt 6 or otherwise from a suitable motor—as, for example, a shunt-wound motor 7 of ordinary type. The booster 5 is provided with an armature 8 and a series field 9, in series with each other and with one of the mains of the distributing system—as, for example, the main 3, as shown. In addition to the series winding 9 we provide a small supplemental or differential winding 10, excited from any suitable constant-potential source—as, for example, across the mains 2 3 of the distributing system indicated. A rheostat 11 in circuit with this differential winding serves to adjust and regulate its magnetomotive force.

No special description of the driving-motor 7 is required, since it may be of any ordinary and well-known type suitable for the purpose. The field and rheostat for the motor are, however, indicated, respectively, at 12 and 13.

The differential winding 10 of the booster is designed and its current is adjusted so as to produce the desired demagnetizing effect in the field of the booster, and therefore the desired reduction in the hump or convexity of the saturation-curve in the neighborhood of half load. At or near full load the effect of this differential winding is not felt as much in proportion, owing, as has been before mentioned, to the smaller angle of inclination of the saturation-curve of the magnetic circuit at this point.

Although we have described with particularity one embodiment of our invention, we do not wish to be limited to the precise arrangement shown, since it is evident that various modifications of the same may be made without departing from the spirit of our invention.

What we claim as new, and desire to secure by Letters Patent of the United States, is—

1. The combination in a booster, of a winding in series with its armature, and a constantly-excited differential winding adjusted so that the booster generates practically no voltage at no load.

2. The combination with conductors, of a booster having a field-winding and armature in series in one of said conductors, and a differential winding excited in shunt from said conductors and adjusted so that the booster generates practically no voltage at no load.

3. The combination with a booster, of means associated therewith for causing the booster while in operation to generate practically no voltage at no load.

In witness whereof we have hereunto set our hands this 5th day of April, 1901.

HERMANN F. T. ERBEN.
   ARTHUR F. KNIGHT.

Witnesses:
 BENJAMIN B. HULL,
 MARGARET E. WOOLLEY.